Oct. 21, 1930.  R. A. NORLING  1,779,245
VENTING MEANS FOR PNEUMATIC DRILLS
Filed April 18, 1927
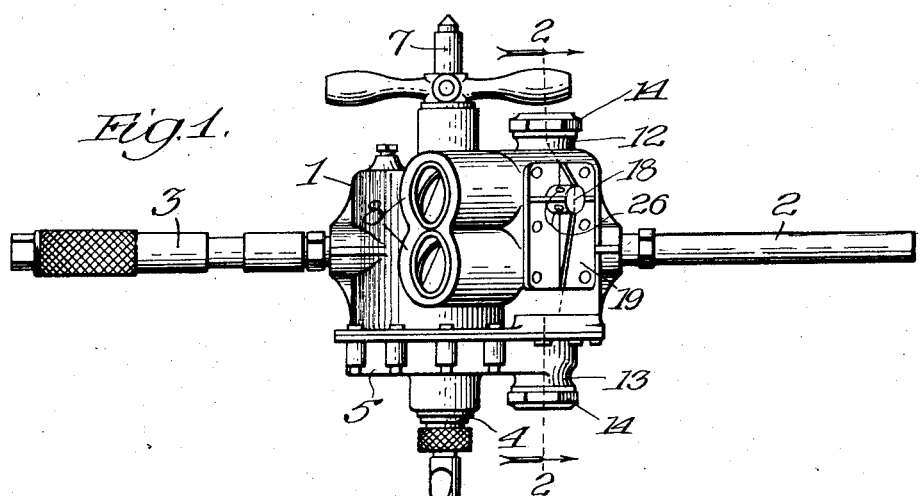
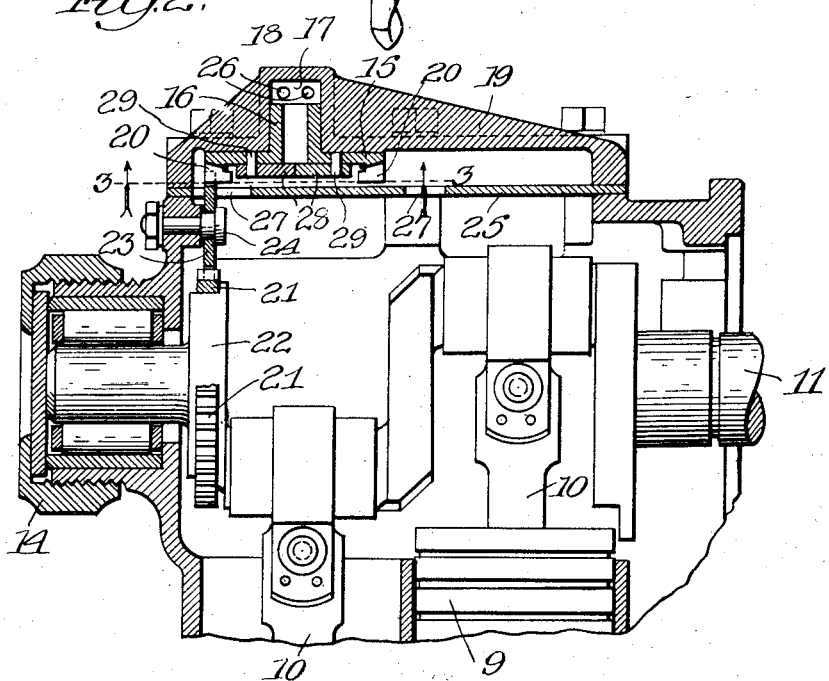
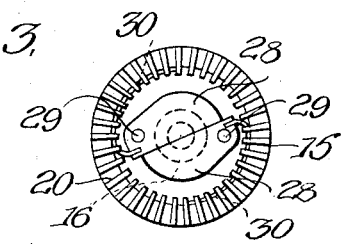
Inventor:
Reinhold A. Norling, Patented Oct. 21, 1930

1,779,245

UNITED STATES PATENT OFFICE

REINHOLD A. NORLING, OF AURORA, ILLINOIS, ASSIGNOR TO INDEPENDENT PNEUMATIC TOOL COMPANY, OF CHICAGO, ILLINOIS, A CORPORATION OF DELAWARE

VENTING MEANS FOR PNEUMATIC DRILLS

Application filed April 18, 1927. Serial No. 184,564.

This invention relates to crank case venting for rotary pneumatic tools, such as drills.

In tools of this type, the crank and gear cases are united and the moving parts of the motor, such as the crank shaft and the connecting rod bearings as well as the gears, are lubricated by the splash system, a slow flowing oil or grease being the lubricant employed. These tools in operation are placed and held in various positions, up, down, horizontal, and at angles, depending on the lay of the work. It therefore follows that the lubricant from gravity accumulates in various places in the drill cases according to the positions in which the tools are held. The cylinder and valve bores open into the gear and crank cases, respectively, and the compressed air used in operating the tool leaks into both cases. Unless prevented, there would be an undesirable accumulation of air pressure in the crank case. Should a plain hole be made in the crank case for venting purposes, there would always be some position of the tool where the lubricant would cover the hole and be forced out of the case as the pressure therein increased. Even in other positions, the lubricant would be forced out of the case with the escaping air, as the lubricant is churned and becomes aerated in the operation of the tool and thus is readily carried out with the escaping air.

Prior Patent No. 1,591,539, granted July 6, 1926, to myself and Axel Levedahl, discloses a venting means in which the air vent passage is formed in the crank shaft and opening to the atmosphere through an end of the crank shaft and preferably the upper end, that is, the end which is uppermost when the tool is held in a position with the drill bit extending downward. With the vent passage so provided, it opens to the atmosphere through the thrust plate over the outer end of the shaft. The shaft in its end play moves away from this plate and allows the lubricant which follows the air to escape about the outer end of the shaft.

Said patent also discloses a centrifugally operated valve means for opening and closing the vent passage through the vented end of the crank shaft. This valve means is mounted on and carried by one of the arms of the crank shaft and, as the diameter of this arm is limited, the amount of centrifugal force exerted on the valve means and on the lubricant during the rotation of the crank shaft is likewise limited.

The main object of my present invention is to separate the lubricant from the air as it enters the vent by centrifugal action without having the vent passage in any part of the crank shaft as heretofore, and thus permit the end journals for this shaft to be tightly closed against leakage of lubricant.

A further object of my invention is to have the rotary member by which the centrifugal force is created to separate the lubricant from the escaping air farther out from the center of the crank shaft than the diameter of the crank arm, and thus permit said member to be rotated at a much faster speed than the crank shaft, and increase the efficiency of the centrifugal action.

A further object of my invention is to mount this rotative member in a portion of the crank case and drive it by a gear connection from one of the arms of the crank shaft.

With my improved venting means, the vent passage for the air may be located relatively close to one end of the crank case and yet prevent lubricant from running out of such passage in the event that the tool be held in a position with said passage lowermost without using any valve means for closing the vent passage at that time, especially when the tool is idle.

The invention consists further in the matters hereinafter described and claimed.

In the accompanying drawings—

Fig. 1 shows a portable piston actuated air drill equipped with a crank case venting means of my invention;

Fig. 2 is an enlarged fragmentary vertical sectional view, taken on line 2—2 of Fig. 1, to show the venting structure; and Fig. 3 is a bottom plan view of the rotary venting member, taken on line 3—3 of Fig. 2.

The tool shown in Fig. 1 has an outside case 1 having a handle 2 on one side and a combined handle and throttle valve on the opposite side through which compressed air is supplied to the tool for operating it. The spindle 4 of the tool extends out beyond the gear case 5, which is bolted to one end of the case 1. The spindle 4 is made to carry a bit 6, as in tools of this character. At the opposite end of the tool is a screw feed 7, as usual.

The case 1 is provided on each side with a pair of parallel cylinders 8, 8, only one pair being shown in the drawing. These cylinders are arranged V type, and in them work single acting pistons 9 (only one being shown in Fig. 2). The pistons are connected by connecting rods 10 to a crank shaft 11. The shaft 11 is usually offset to one side of the spindle 4 and has a gear connection therewith, the gears being in the gear case 5. The ends of the shaft 11 are journaled in roller bearings in extensions 12, 13 on the cases 1 and 5, respectively. These extensions are closed by screw cap assemblies 14, 14, and lubricant is prevented from leaking out of the cases about the ends of the crank shaft.

Associated with the case 1 is a rotary member 15 having a tubular hub or bearing extension 16 fitting in a cylindric recess 17 in a boss 18 preferably cast integral with the cover plate 19 for the opening in the case 1. The member 15 is rotated from the crank shaft 11, preferably by a gear connection between the two. This connection, as shown in Fig. 2, comprises gear teeth 20 about the periphery of the rotary member 15, and a ring gear 21 having a pressed fit on or otherwise secured to one of the arms 22 of the crank shaft 11, and a pinion 23 in mesh with the ring gear 21 and the teeth 20 on the rotary member 15, respectively. The ring gear 21 is fitted on the crank arm 22 at the upper end of the shaft 11, and the pinion 23 is supported by the adjacent wall of the crank case by a stud 24 extending through said wall, as shown.

A plate 25 extends over the opening in the case 2 for which the cover 19 is provided. This plate is clamped in place by the same cap screws which hold the cover 19 in place and extends over the rotary member 15 on the under or inner side thereof so as to prevent the latter from dropping out of its bearing recess 17. Said recess 17 is longer than the tubular bearing member 16 so as to provide a chamber at its inner end which is open to the atmosphere through a number of vent holes 26 in the boss 18.

The plate 25 is provided with a number of apertures 27 on opposite sides of the periphery of the rotary member 15, so that the air accumulating in the crank case in attempting to escape through the vent passage provided through the hollow bearing member 16 and the vent holes 26 is required to pass through the openings 27 in this plate and through the teeth 20 of the rotary member before reaching the vent passage. Thus any lubricant carried by the escaping air will be drawn into direct contact with the member 15, which in being rotated by the crank shaft will set up centrifugal forces strong enough to throw the lubricant back into the crank case, and thus prevent any lubricant from passing out of the crank case with the air through the vent passage. It is to be noted that the member 15 is located well outside of the diameter of the crank arms 22 of the crank shaft 11, and thus the effective diameter of the gearing may be such as to cause the member 15 to be turned at a much higher speed than that of the crank shaft. This will greatly increase the centrifugal action of the rotary member 15 and insure throwing all lubricant off of the same, so that no opportunity is afforded for the lubricant to be carried out of the vent passage with the escaping air.

With the ring gear 21 on the crank arm 22 adjacent the upper end shaft 11, the rotary member 15 may be located adjacent the same end of the shaft, and thus the air in escaping from the case must pass to the upper end of the case. This will supply lubricant to the upper end of the shaft and also to the upper connecting rod bearing, and prevent such parts from running dry when the tool is held in a position with the drill bit extending downward, as shown in Fig. 1.

With the rotary member 15 so located, I may employ a valve means for closing the vent passage when the tool is idle, so that no opportunity is afforded for lubricant leaking out of the vent passage should the tool be held or placed in a position with the upper end of the shaft 11 extending downward. This often happens when the tool is stopped while drilling upward. This valve means may take the form of a pair of shutter plates 28, 28 pivoted in opposition at 29, 29 to the side of the rotary member 15 adjacent the supplemental cover plate 25, as shown in Figs. 2 and 3. Light springs 30, 30 are carried by the member 15, one for each shutter plate 28, and engage the same in such a manner as to hold the shutter plates together over the passage through the bearing extension 16, and thus close said passage to the escape of air when the member 15 is not in rotation or when its rotation is so slow that insufficient centrifugal force is developed to overcome the action of the springs. This would happen should the drill be under heavy load and the crank shaft 11 be rotated slowly. As soon as the load is relieved, the motor would immediately speed up the crank shaft and the shutter plates 28 would be separated so as to open the vent passage and allow the accumulated air to escape. This air being under some pressure would pass quickly out of the vent passage, but any lubricant carried thereby would be first picked up by the rotary member 15 and be thrown off of the same under the centrifugal forces and thus be retained in the case.

This action of separating the lubricant from the escaping air would be just as effective when the drill is in operation without the shutter plates 28. The latter are employed merely to close the vent passage when the tool is idle and held in an inverted position. As shown in Fig. 2, the vent passage is spaced inward from the end wall of the case and a considerable amount of lubricant would be required to collect at that end of the case before any could run out of the vent passage if the shutter plates were not used. These are used, however, as a safety feature in order to close the vent passage and thus prevent the leaking of lubricant therethrough should the amount of lubricant be sufficient to stand at a level above the vent passage when the tool is idle and held in the inverted position referred to.

With the venting mechanism of my invention as shown and described, the employment of a vent passage through the crank shaft is avoided, and thus no opportunity is afforded for the lubricant to leak or work out of the crank case through the opening in the crank shaft or about the outside of the crank journal and over the outer end of the same when the crank moves endwise under end thrusts. Moreover, with my improved construction, the centrifugal action in separating the lubricant from the escaping air is more efficient because the rotary member may be turned at a greater rate of speed than the crank shaft. Furthermore, it is not necessary to employ any valve means on the crank shaft in connection with the vent passage.

The details of structure shown and described may be variously changed and modified without departing from the spirit and scope of my invention.

I claim as my invention:

1. In a fluid actuated rotary tool, the combination with a casing, of a crank shaft journaled therein, a rotary member carried by said casing to one side of the crank shaft and having a vent passage open to the atmosphere whereby fluid tending to accumulate in the casing during the operation of the tool is permitted to escape from the casing to the atmosphere through said vent passage, means whereby the crank shaft rotates the rotary member for setting up centrifugal forces to separate lubricant from the escaping fluid, and a plate over said crank shaft for deflecting the accumulating fluid toward said rotary member.

2. In a fluid actuated rotary tool, the combination with a casing, of a crank shaft journaled therein, a rotary member carried by the casing at one side of said shaft and having a vent passage open to the atmosphere whereby the fluid tending to accumulate in the casing during the operation of the tool is permitted to escape from the casing to the atmosphere through said vent passage, means whereby the crank shaft rotates the rotary member, and centrifugally opened valve means carried by the rotary member for the vent passage therein.

3. In a fluid actuated rotary tool, the combination with a casing, of a crank shaft journaled therein, a rotary member carried by the casing at one side of said shaft and having a vent passage open to the atmosphere whereby fluid tending to accumulate in the casing during the operation of the tool may escape from the casing to the atmosphere through said vent passage, and means whereby said rotary member is rotated from the periphery of one of the arms of the crank shaft for setting up centrifugal forces to separate lubricant from the escaping fluid.

4. In a fluid actuated rotary tool, the combination with a crank case, of a crank shaft journaled therein, a cover for said case, a rotary member inside of the cover and journaled therein and having a vent passage therethrough, a plate between the case and cover and extending over the inner side of the rotary member for retaining the same in the cover, said plate having openings so that fluid within the casing may reach the vent passage, and a driving connection from the crank shaft to the rotary member.

5. In a fluid actuated rotary tool, the combination with a crank case, of a crank shaft journaled therein, a cover for said case, a rotary member journaled in the cover and having a vent passage therethrough, said rotary member having gear teeth on its under side, a plate between the case and the cover and extending over the under side of the rotary member to retain it in the cover and provide air passages with the teeth, said plate having openings adjacent the teeth so that the the accumulated air escaping from the interior of the case must pass through the teeth to reach the vent passage, and a gear connection between the teeth of the rotary member and the crank shaft.

6. In a fluid actuated rotary tool, the combination with a crank case, of a crank shaft journaled therein, a cover for the crank case, a rotary member mounted in the cover and having a vent passage therethrough, means whereby the rotary member is rotated by the crank shaft, shutter plates pivotally carried by the rotary member for opening and closing the vent passage therethrough, and spring means for normally closing the plates and permitting the plates to be automatically opened under the effect of the centrifugal forces set up on the rotation of the rotary member.

7. In a fluid actuated rotary tool, the combination with a crank case, of a crank shaft journaled therein and having crank arms, a rotary member carried by the case and having a vent passage therethrough, said rotary member having gear teeth about the same, a ring gear on one of the crank arms, and a gear pinion supported in the crank case and in mesh with the ring gear and teeth on the rotary member, respectively.

8. In a fluid actuated rotary tool, the combination with a crank case, of a crank shaft journaled therein, a cover for the case and having an outwardly extending boss with a recess therein open to the atmosphere, a rotary member inside of the cover and having a hollow bearing extension on one side and gear teeth on the other, said hollow extension fitting in said recess and opening into the same to vent the case through said extension, a gear on the crank shaft, a gear pinion in the case in mesh with the gear teeth on the rotary member and the gear on the crank shaft, respectively, and means for holding the extension in said recess.

In testimony whereof I affix my signature this 14th day of April, 1927.

REINHOLD A. NORLING.